3,779,962
STABILIZER-LUBRICANT COMBINATIONS FOR HALOGEN-CONTAINING POLYMERS
Gunter Koenen, Kirchfeld 15, Lendersdorf, near Duren, Germany, and Alfred Szczepanek, Gurzenicher Strasse 45, Duren-Rolsdorf, Germany
No Drawing. Continuation-in-part of application Ser. No. 865,213, Oct. 9, 1969, which is a continuation-in-part of application Ser. No. 619,150, Feb. 28, 1967, both now abandoned. This application Oct. 9, 1970, Ser. No. 79,660
Int. Cl. C08f 45/56, 45/62
U.S. Cl. 260—23 XA               11 Claims

ABSTRACT OF THE DISCLOSURE

Dust-free, stabilizer-lubricant compositions for halogen-containing polymers, particularly polyvinyl chloride, contain a free-flowing homogeneous melt of a metal-free organic material compatible with the polymer, a basic lead salt of an inorganic or an organic acid, and optionally a calcium, barium or strontium soap of a $C_{8-22}$ monocarboxylic acid.

RELATED APPLICATIONS

This application is a continuation-in-part of application Ser. No. 865,213, filed Oct. 9, 1969 which, in turn, is a continuation-in-part of application Ser. No. 619,150, filed Feb. 28, 1967 each of which has been abandoned.

FIELD OF INVENTION

This invention relates to dust-free stabilizer-lubricant combinations for halogen-containing polymers.

BACKGROUND OF THE INVENTION

Halogen-containing polymers such as polyvinyl chloride (PVC) are protected from the action of heat and light by addition of stabilizers. According to their appearance, the stabilizers may be subdivided into liquid and pulverulent products. Both groups comprise many substances which are highly toxic. Among the toxic stabilizers, especially the pulverulent ones represent a serious hazard to the operator because they produce dust in weighing and processing operations and the dust is taken up particularly easily by the respiratory organs and leads to injury to health. Among the toxic pulverulent stabilizers are especially the lead and barium-cadmium compounds. Several methods have been used previously to avoid the formation of toxic dust in processing.

One possibility is to convert the dust-forming products into a dust-poor state by moistening with plasticizers. While this route permits a diminution of toxic dust, it does not completely prevent its formation. Another method is the known conversion of suitable barium, cadmium, zinc and lead compounds into liquid stabilizer mixtures by dissolution in suitable media. However, this method which leads to complete avoidance of toxic dust is only possible in case of stabilizers which are soluble in suitable media. Moreover, these stabilizers are only of limited use for the processing in rigid PVC because the solvents necessarily added deteriorate the mechanical properties, e.g. the softening point. For the group of toxic stabilizers which are insoluble in suitable media, the method of slurrying with plasticizers has been used. While these stabilizer pastes are dust-free, they are very difficult to meter and are unsuitable in many cases for use in rigid PVC by the incorporation of the plasticizer.

The processing of rigid PVC by extrusion or calendering requires a balanced system of non-slippery stabilizers, slippery stabilizers and lubricants.

It is an object of this invention to provide a process wherein toxic pulverulent stabilizers which are insoluble in suitable media are converted alone or in mixture with other stabilizers into dust-free mixtures which are free from plasticizing constituents and which are useful especially for the processing of rigid PVC.

SUMMARY OF THE INVENTION

In accordance with the invention, there are provided compositions free of a plasticizing constituent comprising a free-flowing homogeneous melt of:

(a) from about 10 to about 90 percent by weight of a basic lead salt of an inorganic or an organic acid having from about 8 to about 22 carbon atoms per molecule, and (b) from about 90 to about 10 percent by weight of an ester wax or an alcohol having from about 12 to about 22 carbon atoms per molecule, said ester wax or alcohol having a melting point above about 25° C., and wherein more than about 10 percent by weight of (a) and (b) have a melting point below about 130° C.

Another embodiment of the invention comprises compositions containing the components of (a) and (b), above, and another component, namely:

(a) from about 10 to about 92 percent by weight of a basic lead salt of an inorganic or an organic acid having from about 8 to about 22 carbon atoms per molecule, (b) from about 4 to about 86 percent by weight of an ester wax or an alcohol having from about 12 to about 22 carbon atoms per molecule, said ester wax or alcohol having a melting point above about 25° C., and (c) from about 4 to about 86 percent by weight of a metal soap of a monocarboxylic acid having from about 8 to about 22 carbon atoms per molecule, the metal component of which is selected from the group consisting of calcium, barium and strontium, and wherein more than about 10 percent by weight of (a) (b) and (c) have a melting point below about 130° C.

Related embodiments comprise polyvinyl chloride resin compositions containing as stabilizers therefor, two-component and three-component compositions as defined above.

DESCRIPTION OF THE SPECIFIC EMBODIMENTS

Basic leads salts of inorganic or organic acids comprise component (a). These are toxic, insoluble, pulverulent stabilizers for halogen-containing polymers. Examples of such salts include basic lead salts of sulfuric acid, phosphorous acid, carbonic acid, silicic acid, stearic acid, salicylic acid and phthalic acid; basic lead complex salts of such inorganic and organic acids; and basic lead salts of such inorganic or organic acids with alkyl phenols. Pigment-like stabilizers are typified by tribasic lead sulfate, tetrabasic lead sulfate, dibasic lead phosphite, basic lead carbonate, dibasic lead phthalate and monobasic lead salicylate.

As indicated above, an ester wax or an alcohol having from about 8 to about 22 carbon atoms per molecule is employed as component (b). Typical of such a component are: spermaceti (predominantly cetyl palmitate); esters of fatty acids with glycol or long-chain alcohols; and fatty alcohols such as tallow alcohols and cetyl alcohol. Component (b) melts above 25° C. and is compatible with PVC.

Component (c) is a metal soap of a monocarboxylic acid having from about 8 to about 22 carbon atoms per molecule, the metal component of which is calcium, barium, or strontium. These metal soaps have a melting point above 130° C., such as calcium, barium and strontium stearates.

In the process of the invention, the toxic, insoluble, pulverulent stabilizers (a) are dispersed in the molten lubricants (b) or in the molten mixtures of lubricants and stabilizers (b) and (c) and are converted into the crystalline state by means of a scale roller or similar device or by being simply allowed to flow out into crystallizing pans. They are present in solid form and are completely dust-free because the lubricants have inherently substantially higher adhesion than that of the pulverulent stabilizers. Surprisingly, these lubricant-stabilizer compositions which contain stabilizers which are insoluble in PVC are dispersed completely and without pimples and filler specks when incorporated in PVC with conventional mixers at slightly elevated temperature. In addition, the efficiency of these compositions with respect to their dynamic stability is superior to that obtained when incorporating the individual component separately.

It has further been found that a number of metal soaps which are used as stabilizers or as stabilizer-lubricant can be prepared very conveniently by this fusion process. The metal soaps, e.g. the metal soaps of stearic acid known as stearates are prepared either by the fusion process by reacting the molten stearic acid with metal oxides, hydroxides or metal salts of volatile short-chain aliphatic carboxylic acids or by double reaction of their sodium soaps with water-soluble salts of the corresponding metals by the precipitation process. The precipitation process gives very pure and voluminous products because it is operated at temperatures below 100° C. However, due to filtration and drying cost, it is substantially more expensive than the fusion process in which the metal soaps are produced by a simple melting process and ground to fine powders after previous crushing to the solidified melt. For many commercial uses, e.g. in the file of rigid PVC tubes, the stabilizers prepared by the fusion process are sufficient with respect to purity and color. However, the fusion process permits only the preparation of metal soaps the melting point of which ranges below about 130° C. and the melt of which is of low viscosity. If the use of higher temperatures is required, an excessive loss in quality by cracking processes is encountered. In case of an excessively high viscosity, the reaction of the insoluble metallic component with the fatty acid is seriously hindered and does not proceed to completion.

The process of the invention surprisingly permits also the preparation of high melting metal soaps such as, for example, dibasic lead stearate, calcium stearate, barium stearate, and strontium stearate. The reaction is facilitated by adding a small amount of water. The reaction temperature is dependent upon the melting point of the particular lubricant used and generally ranges between 100 and 120° C. In the previously described process, solutions or dispersions of metal soaps in lubricant melts are obtained as the first reaction stage. To these are then added in a second stage the pigment-like insoluble stabilizers which are dispersed therein. A further advantage of this process is the unexpected blocking of calcium soaps with respect to their reactivity with certain inorganic metal salts such as basic lead sulfates. Calcium stearate is a preferred constituent of lubricant-stabilizer combinations in rigid PVC processing.

The basic lead salts of inorganic acids (a) can be produced in the organic material (b) from the raw materials lead oxide and acid. Separate production of the basic lead combinations in the manner known heretofore is hereby eliminated. The organic material (b) serves as a reaction medium, whereby the necessary amount of lead oxide is slowly added and is dispersed in a melt of the organic material at a temperature of between 100° C. and 150° C. To carry out the reaction, a small amount of water solvent such as acetic acid, formic acid or an emulsifying agent such as an alkanolamine, polyol or other higher alcohol. Intensive mixers or kneaders are employed. The resulting product can be added, as a preliminary product for further processing, to the stabilizer-lubricant combination.

In a liquid phase such as the melt phase, e.g. when contacting calcium stearate and basic lead sulfate in a lead stearate melt, it reacts unexpectedly with the basic lead sulfate to form lead stearate and calcium sulfate. Due to this behavior, it is not possible by both the wet process and the fusion process to produce stabilizer mixtures the composition of which corresponds to the starting components. Moreover, the properties of these stabilizer mixtures are not reproducible because the degree of reaction is dependent upon the temperature and time. Surprisingly, this reaction between calcium stearate and basic lead sulfate is blocked by the presence of a lubricant in the melt so that it is possible to prepare stabilizer-lubricant compositions which are identical with the combination of the starting materials with respect to their pigment effect, e.g. as white pigment.

The composition of the stabilizer-lubricant mixtures is dependent upon the requirements to be met in practice and can be varied at will provided that the mixture is still capable of being agitated in the melt by stirrers or kneaders. To meet this condition, 10 to 20% of the constituents having a melting point below 130° C. are necessary. In the two-component compositions, from about 10 to about 90, and preferably 15–85, percent by weight of the lead salt is used with from about 90 to about 10, and preferably 85–15, percent by weight of the ester wax or alcohol. In the three-component compositions, the balance of proportions is approximately, in weight percent:

(a) lead salt—10–92, preferably 18–84
(b) ester wax or alcohol—4–86, preferably 8–82
(c) metal salt $C_{8-22}$ acid—4–86, preferably 8–82.

The process is illustrated by the following examples.

Example 1

Spermaceti in an amount of 30.2 g. is heated with 17.6 g. of stearic acid to 120° C. At this temperature, 1.81 g. of calcium oxide are added. To achieve rapid reaction, the melt is sprayed with little water. After the reaction of the calcium oxide, 75.6 g. of dibasic lead phosphite are added at 100° C. The homogeneous melt is flaked by means of a cooling roller. It contains 37.73% of dibasic lead phosphite, 37.73% of dibasic lead stearate, 9.43% of calcium stearate and 15.11% of spermaceti.

Example 2

16.67 grams of spermaceti and 16.67 g. of tallow alcohol are heated with 12.28 g. of stearic acid to 120° C. Then 0.711 g. of calcium oxide are added and the reaction is accelerated by spraying some water onto the mixture. After the calcium oxide added has reacted, 2.219 g. of lead oxide are slowly added. While maintaining the temperature at about 100° C., the melt turns white after about 30 minutes, an indication that the yellow lead oxide has reacted. While stirring at the same temperature, 51.8 g. of tetrabasic lead sulfate are added and the resultant homogeneous melt is flaked by means of a cooling roller. It contains 51.84% of tetrabasic lead sulfate, 7.41% of lead stearate, 7.41% of calcium stearate, 16.67% of spermaceti and 16.67% of tallow alcohol.

Example 3

32.15 grams of spermaceti and 17.85 grams of tallow alcohol are heated to 120° C. At this temperature, 5.36 g. of calcium stearate are added. Then 26.9 g. of tetrabasic lead sulfate and 17.85 g. of a basic complex salt consisting of 95% dibasic lead phosphite and 5% p-octyl phenol are added in succession. After stirring for about 10 to 15 minutes at 100° C. both constituents are homogeneously dispersed. The readily stirrable homogeneous melt is flaked by means of a cooling roller. It contains 17.85% of a basic complex salt consisting of 95% dibasic lead phosphite and 5% p-octylphenol, 26.8% of tetrabasic lead sulfate, 5.35% of calcium stearate, 32.15% of spermaceti and 17.85% of tallow alcohol.

The lubricant combinations described in the examples were tested in comparison with the effect of the individual components by means of a Brabender plastograph equipped with a 30 g. kneader for rigid PVC. The result is shown in the following table.

Test 1: Example 1 to 3,072,586 including tribasic lead sulphate
Test 2: Example 2, above
Test 3: Tribasic lead sulphate
Test 4: Mixture of individual components of Example 2, above.

| Stabilization | PVC, parts | Test temp., °C. | Brabender time in minutes until loss of temperature stability |
|---|---|---|---|
| Example 1: 5.3 parts | 50 Solvic 229, 50 Solvic 136 | 180 | 68 |
| Individual components: 2 parts dibasic lead phosphite; 2 parts dibasic lead stearate; 0.5 part calcium stearate; 0.8 part spermaceti | 50 Solvic 229, 50 Solvic 136 | 180 | 59 |
| Example 2: 6 parts | 100 Dynamit AG, S 55D | 180, 200 | 83, 43 |
| Individual components: 3.12 parts tetrabasic lead sulfate; 0.44 part lead stearate; 0.44 part calcium stearate; 1 part spermaceti; 1 part tallow alcohol | Dynamit AG, S 55D | 180, 200 | 61, 37 |
| Example 3: 5.6 parts | 100 Vinnol H 100/55D | 200 | 48 |
| Individual components: 1 part complex salt: dibasic lead phosphite, 95%; p-octyl phenol, 5%; 1.5 parts tetrabasic lead sulfate; 0.3 part calcium stearate; 1.8 parts spermaceti; 1.0 part tallow alcohol | Vinnol H 100/55D | 200 | 35 |

The proprietary compositions identified by trademarks are either polyvinyl chloride suspensions or emulsions, namely:

Solvic 229 PVC Suspension; K value, 65
Solvic 136 PVC Emulsion; K value, 70
Dynamit AG–55D PVC Suspension; K value, 55
Vinnol H 100/55D PVC Suspension; K value, 55.

Example 4

30 g. tallow alcohol are heated to 120–130° C. At this temperature, within 10 minutes, 70 g. of dibasic lead phosphite are added. The melt is well homogenized and flaked by means of a cooling roller.

Example 5

25 g. of stearyl alcohol are heated, with 69.15 g. of PbO, to 100° C. and, at this temperature, 0.3 g. acetic acid, 2 g. water and 0.5 g. triethanolamine are added. At temperatures between 100–140° C., 6.05 g. of sulphuric acid (diluted 1:2 with water) is added dropwise. Reaction ensues slowly and is controlled by the addition of the sulphuric acid. The resulting homogeneous reaction melt is pulverized or used as such as a preliminary product for further processing.

Example 6

20 g. of stearyl alcohol are heated, with 37.74 g. of stearic acid, to 120° C. 44.48 g. of PbO are added gradually. In order to obtain quick reaction, the resulting melt is sprinkled with a small amount of water. At the end of the reaction, the temperature is approximately 140–150° C. The resulting homogeneous melt is flaked by means of a cooling roller, or can be further processed as such.

Example 7

Comparison was made of the composition described in Example 1 of U.S. Pat. No. 3,072,586 and the composition obtained in Example 2 of this application. In order that a thorough comparison be made, Debye-Scherrer data was also obtained for tribasic lead sulphate and for a mixture of the individual components of said Example 2, the components being subjected to intensive mechanical mixing. The comparison involved:

Comparison of tests 1 and 3 revealed that no chemical reaction occurred between tribasic lead sulphate and other components, since there is generally a tolerance span of 0.05 D of the various relative intensities due to the different crystalline formations. The loss of a few very weak intensities in test 1 in comparison with test 3 is normal.

Comparison of tests 2 and 4 clearly reveals, especially in the region of high D values, a new line in test 2, for example, D 16.20, D 9.82, D 8.21, D 5.81, D 4.31, D 3.67, D 3.34. Proof of chemical reaction is established, since the new line is indicative of chemical reaction having taken place. Therefore, the composition of Example 2 is not merely a mechanical coating of a pigment component or components.

The Debye-Scherrer data follows.

RELATIVE INTENSITIES

| a-Value | Test 1 | Test 2 | Test 3 | Test 4 | a-Value | Test 1 | Test 2 | Test 3 | Test 4 |
|---|---|---|---|---|---|---|---|---|---|
| 16.20 | | 10 | | | 2.72 | 15 | | 6 | |
| 16.05 | | | | 3 | 2.70 | 15 | 7 | | |
| 12.62 | | | 3 | | 2.66 | | 16 | | |
| 9.82 | 44 | 13 | 5 | | 2.65 | | | 53 | 31 |
| 9.70 | | | | 2 | 2.63 | 13 | 6 | | |
| 8.21 | 2 | 9 | 11 | | 2.60 | | | 5 | |
| 8.10 | | | | 10 | 2.59 | | | | 2 |
| 7.20 | | 2 | | | 2.49 | 20 | 7 | | |
| 7.15 | | | 3 | 2 | 2.45 | | 4 | 3 | |
| 6.20 | 9 | 4 | | | 2.44 | 9 | | | 2 |
| 6.15 | | | 5 | | 2.43 | | 3 | | |
| 6.14 | | | | 2 | 2.34 | 2 | | 3 | |
| 5.81 | | | 5 | | 2.32 | 3 | 2 | | |
| 5.80 | | 10 | | | 2.25 | | | 4 | |
| 5.75 | 20 | | | | 2.24 | 4 | 2 | | |
| 5.70 | | | | 2 | 2.20 | | | | 2 |
| 5.42 | | 2 | 3 | | 2.16 | 8 | 3 | | |
| 5.38 | | | | 2 | 2.13 | 4 | 2 | | |
| 5.18 | | | 2 | | 2.08 | 14 | | | |
| 5.15 | | 2 | | 1 | 2.07 | | 6 | | |
| | | | | | 2.05 | | 2 | 5 | |
| 4.85 | 15 | 5 | | | 2.03 | | | | 2 |
| 4.48 | 3 | 2 | | | 2.02 | 3 | 2 | 5 | |
| 4.25 | 23 | 9 | 7 | | | | | | |
| 4.24 | | | | 2 | 1.98 | 7 | | | |
| 4.13 | | | 15 | | 1.96 | | 9 | 22 | 14 |
| 4.06 | | | | 4 | 1.94 | 8 | 17 | 29 | 21 |
| 3.67 | | | 5 | | 1.90 | 3 | | | |
| 3.65 | 14 | 2 | | | 1.86 | 11 | 6 | 5 | |
| 3.60 | | 7 | | | 1.85 | | | | 3 |
| 3.56 | 14 | | | | 1.83 | | | 10 | |
| 3.34 | 9 | | 15 | | 1.82 | 10 | 4 | | 5 |
| 3.33 | | 6 | | | 1.79 | 4 | | | |
| 3.27 | | 68 | | | 1.78 | | 2 | | |
| 3.24 | 100 | 100 | 100 | 100 | 1.76 | 5 | | | |

TABLE—Continued

| α-Value | Test 1 | Test 2 | Test 3 | Test 4 | α-Value | Test 1 | Test 2 | Test 3 | Test 4 |
|---|---|---|---|---|---|---|---|---|---|
| 3.13 |  | 43 | 19 |  | 1.72 |  | 9 | 15 | 11 |
| 3.11 |  |  | 46 |  | 1.69 |  | 6 |  |  |
| 3.10 |  |  |  | 25 | 1.68 | 7 |  | 8 | 6 |
| 3.09 | 21 |  |  |  | 1.65 |  | 6 | 13 |  |
| 3.07 |  | 15 |  |  | 1.64 |  |  |  | 8 |
| 3.06 |  |  | 47 | 27 | 1.63 | 7 |  |  |  |
| 2.95 | 4 | 5 | 15 |  | 1.62 |  | 8 |  |  |
| 2.90 |  |  |  | 4 | 1.61 | 4 |  | 9 | 8 |
| 2.88 | 28 | 35 |  |  | 1.59 |  |  | 8 | 5 |
| 2.86 |  |  | 40 | 29 | 1.58 |  |  | 9 | 5 |
| 2.82 | 13 | 7 |  |  | 1.57 | 10 | 5 |  |  |
| 2.73 |  |  | 8 |  | | | | | |

What is claimed is:

1. A composition free of a plasticizing constituent comprising a free-flowing homogeneous particulate solid of:
   (a) from about 15 to about 85 percent by weight of a basic lead salt of an inorganic or an organic acid, said salt being a stabilizer for halogen-containing polymers, and
   (b) from about 85 to about 15 percent by weight of an ester wax selected from the group consisting of an ester of a fatty acid with a glycol or with a long-chain alcohol, or an alcohol having from about 12 to about 22 carbon atoms per molecule, said ester wax or alcohol having a melting point above about 25° C., and wherein more than about 10 percent by weight of the total weight of (a) and (b) has a melting point below about 130° C.

2. A composition of claim 1, wherein (a) is basic lead sulfate.
3. A composition of claim 1, wherein (b) is spermaceti.
4. A composition of claim 1, wherein (b) is tallow alcohol.
5. A composition free of a plasticizing constituent and effective as a stabilizer for polyvinyl chloride resin compositions, comprising a free-flowing homogeneous particulate solid of:
   (a) from about 18 to about 84 percent by weight of a basic lead salt of an inorganic or an organic acid containing from about 8 to about 22 carbon atoms per molecule, said salt being a stabilizer for halogen-containing polymers,
   (b) from about 8 to about 82 percent by weight of an ester wax selected from the group consisting of an ester of a fatty acid with a glycol or with a long-chain alcohol, or an alcohol having from about 12 to about 22 carbon atoms per molecule, said ester wax or alcohol having a melting point above about 25° C., and
   (c) from about 8 to about 82 percent by weight of a metal soap of a monocarboxylic acid having from about 8 to about 22 carbon atoms per molecule, the metal component of which is selected from the group consisting of calcium, barium and strontium and the melting point of which is above 130° C., and wherein more than about 10 percent by weight of the total weight of (a), (b) and (c) has a melting point below about 130° C.

6. A composition of claim 5, wherein (a) is basic lead sulfate.
7. A composition of claim 6, wherein (c) is calcium stearate.
8. A composition of claim 5, wherein (b) is spermaceti.
9. A composition of claim 5, wherein (b) is tallow alcohol.
10. A polyvinyl chloride resin composition containing as a stabilizer therefor, a composition defined by claim 1.
11. A polyvinyl chloride resin composition containing as a stabilizer therefor, a composition defined by claim 5.

References Cited

UNITED STATES PATENTS

| | | | |
|---|---|---|---|
| 2,564,646 | 8/1951 | Leistner et al. | 260—45.7 |
| 3,072,586 | 1/1963 | Pitrot et al. | 260—28.5 |
| 3,461,081 | 8/1969 | Sugahara et al. | 252—400 |
| 3,519,571 | 7/1970 | Szczepanek et al. | 252—400 |
| 2,997,454 | 8/1961 | Leistner et al. | 260—45.8 |
| 3,355,471 | 11/1967 | Kebrich et al. | 260—435 |
| 3,668,144 | 6/1972 | Pearson | 252—400 |

OTHER REFERENCES

Rose et al.: "The Condensed Chemical Dictionary," 1966, pp. 408, 409, 454, 916.

Warth: "The Chemistry and Technology of Waxes," 1956, pp. 141, 142, 544–548.

Witco Bulletin 55–4R–5–63, received in Patent Office December 1965, pp. 8, 15, 26.

Chevassus et al.: "The Stabilization of Polyvinyl chloride," 1963, p. 237.

DONALD E. CZAJA, Primary Examiner

R. A. WHITE, Assistant Examiner

U.S. Cl. X.R.

252—400; 260—45.75 R